Oct. 2, 1928.
J. D. SCHULTZ
ALARM DEVICE
Filed Feb. 5, 1924
1,686,295
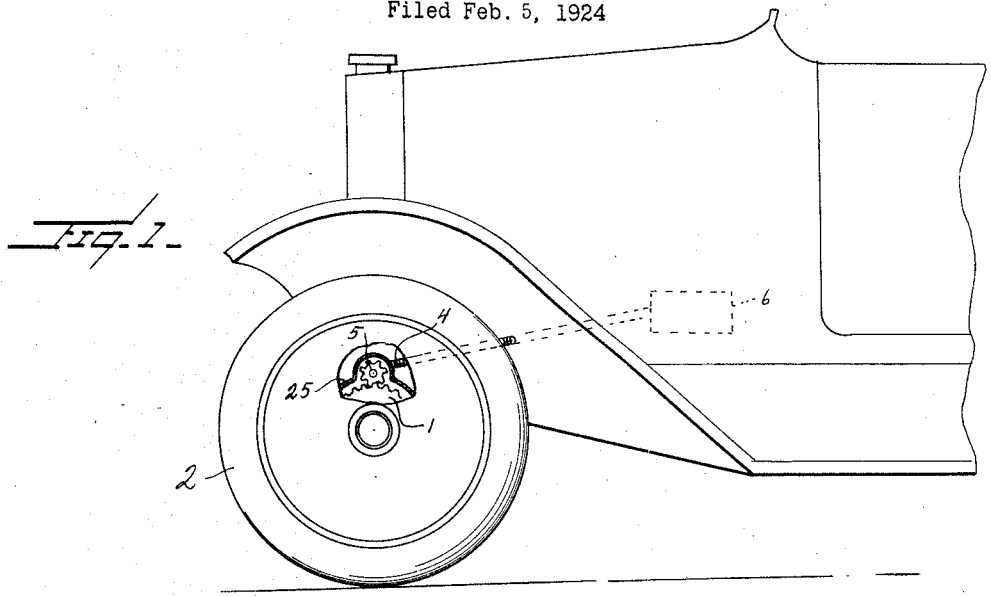
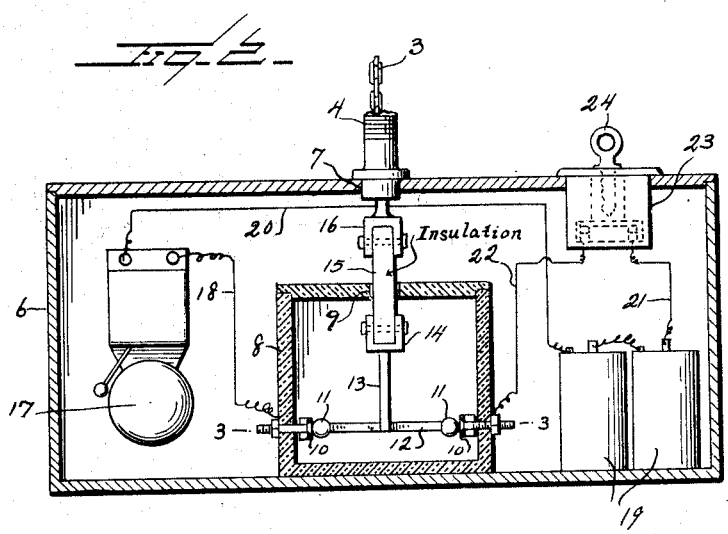
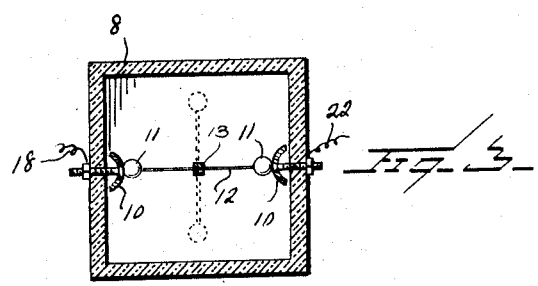
INVENTOR.
J. D. Schultz
BY
Watson E. Coleman
ATTORNEY.

Patented Oct. 2, 1928.

1,686,295

UNITED STATES PATENT OFFICE.

JOSEPH D. SCHULTZ, OF MOUNT CLEMENS, MICHIGAN.

ALARM DEVICE.

Application filed February 5, 1924. Serial No. 690,311.

This invention relates to an improved alarm for use in connection with automobiles and one object of the invention is to provide an alarm which may be mounted upon the car and have a flexible drive shaft rotated from the gear used for operating the speedometer and serving to intermittently sound an alarm when the automobile is moved by someone trying to steal the automobile.

Another object of the invention is to so construct this device that it will operate if the automobile is driven by its own power or it is towed away.

Another object of the invention is to so construct this device that the signal, battery, control switch and contact which is to be operatively connected with the shaft leading to the speedometer gear may all be positioned in a single casing thereby providing a single mechanism which will be protected from being tampered with and which will further constitute a compact mass appearing as a single unit and easy to put in place.

Another object of the invention is to so construct this signal that the lock-operated switch may be set by means of a key inserted and removed through the wall of the outer casing thereby permitting the owner of the automobile to easily put the key in place or remove it when desired.

Another object of the invention is to so construct this signal that it will comprise a comparatively few number of parts practically all of which will be positioned within the outer casing and will not be liable to readily get out of order.

This invention is illustrated in the accompanying drawings, wherein:

Figure 1 is a view showing a portion of an automobile with the improved alarm signal associated therewith.

Figure 2 is an enlarged sectional view through the signal.

Figure 3 is a transverse sectional view taken along line 3—3 of Figure 2.

This improved signal is for use in connection with an automobile and is to be operated from the gear 1 usually provided upon one of the wheels 2 of the automobile and serving to operate the speedometer usually provided upon an automobile. The drive shaft 3 for this signal extends through a strong metal tube 4 and at its outer end carries a gear 5 which meshes with the speedometer operating gear 1. This shaft 3 will be of the usual flexible construction and the tube and flexible shaft may be of any suitable length so that when put in use the main box or outer casing 6 may be secured in place within the engine hood or at any other desired point upon the body of the automobile.

This outer casing 6 may have its walls and top and bottom formed of heavy sheet metal or may be formed as gratings so that the signal may be easily heard. The cover may be hinged or removably mounted and releasably secured in any desired manner so that access may be had to the interior of the box or casing when necessary. The top or one wall of the casing has been provided with an opening 7 so that the flexible shaft 3 and tubing 4 for this shaft may extend through this opening 7 and into the casing.

Within the casing 6 there has been provided a switch box 8 which is secured to the bottom of the box and has its upper end provided with an opening 9. Contacts 10 are provided in the side walls of the switch box and are adapted to be engaged by heads 11 formed at the ends of a flexible arm 12 which is carried by a shaft 13 rotatably mounted in the switch box. The upper end of this shaft 13 is forked, as shown at 14, and secured to the lower end of a block 15 which is preferably formed of wood or fiber and extends upwardly through the opening 9 in the box 8 and is connected with the fork 16 provided at the inner end of the flexible shaft 3. This prevents contact being made between the box and the shaft 13 or flexible shaft 3. The box 8 may be formed of insulated material or it may be formed of metal in which case the contacts 10 would have to be insulated from the body of this box. It will be readily seen that as the shaft 3 rotates the shaft 13 will be rotated with it, and therefore the cross arm or bar 12 will be turned so that the heads 11 provided at its ends may brush across the inner ends of the contacts 10 and the cross bar, which is preferably formed of copper, serve as a bridge connecting these contacts.

In order to sound an alarm when the automobile is moved by an unauthorized person there has been provided a signal such as a bell 17 which is mounted in the outer casing 6 at any suitable point therein and at one side is connected with one of the contacts 10 by means of a conductor wire 18. The other side of this signal bell is connected with one side of a source of power which may be one or more batteries 19 by means of a conductor wire 20. A wire 21 leads from the other side of the source of power and a wire 22 leads from the second contact 10. These wires 21 and 22 are connected with terminals of a switch 23 which is of a conventional key-operated construction and will be secured to one wall of the casing 6 with the key-receiving portion extending through the wall thereby permitting the operator of the automobile to insert the key 24 into the key control switch from a point externally of the casing.

When this device is in use the box or casing 6 will be secured at any desired point upon the automobile and the flexible shaft and tubing 4 for this shaft will be led to the wheel having the speedometer operating gear connected therewith. The gear 5 will be connected with the flexible shaft after this shaft and its casing 4 have been cut the proper length and the gear 5 will be suitably mounted to mesh with the gear 1. If desired, a casing 25 may be provided about the gears 1 and 5 to protect them and of course this casing 25 will be provided with an opening to receive the tubing 4 and flexible shaft 3. When the device is in place the key 24 can then be inserted and the key control switch turned to break connection between the conductor wires 21 and 22. The automobile can then be operated in the usual manner without the signal being sounded. When the driver leaves the car the key will be removed and the switch 23 will then be operated to establish connection between the wires 21 and 22. Therefore, if an unauthorized person attempts to move the automobile by driving it off under its own power or by towing it, except by means of a rocking device which would hold the front wheels elevated, the device will be in operation and as the cross arm 12 turns with the shaft 13 the heads 11 of this cross arm will engage with the contacts 10 thereby permitting the current to pass through the cross bar and complete the circuit. The bell will therefore be caused to intermittently ring and this will indicate that the automobile is being operated or towed by an unauthorized person. It will therefore be seen that the driver of the automobile can operate without the signal being sounded but that when the owner leaves the car and removes the key the signal will be put in condition for use and cannot be prevented from being operated until the key is returned to its proper place.

What is claimed is:

A circuit closer for vehicles comprising a casing of insulating material, a single pair of contacts located within said casing at opposite sides thereof and having threaded stems extending therethrough and carrying binding nuts for connection of conductors therewith, a rotary member journaled through one side of the casing between those sides equipped with said contacts, means for continuously rotating the rotary member during operation of the vehicle, resilient arms projecting laterally in opposite directions from said rotary member, and fly balls on the ends of said resilient arms into the path of which the contacts extend.

In testimony whereof I hereunto affix my signature.

JOSEPH D. SCHULTZ.